Sept. 24, 1940.                B. S. ELSET                 2,215,580
                             ORDNANCE MOUNT
                          Filed April 21, 1938
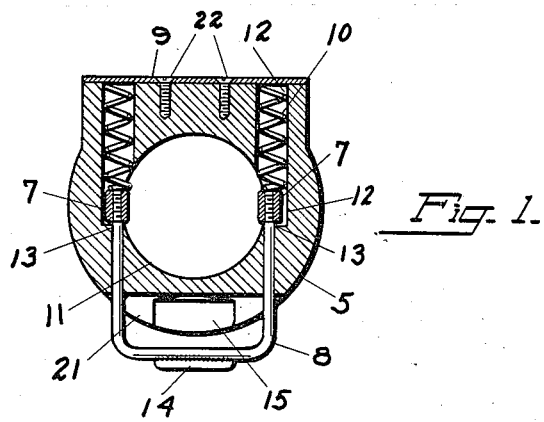
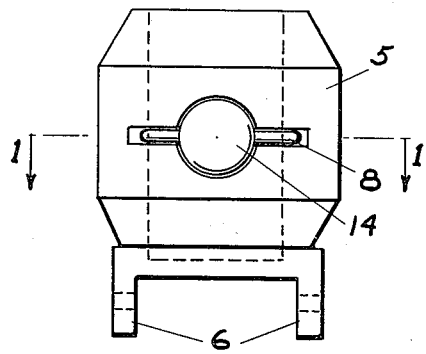 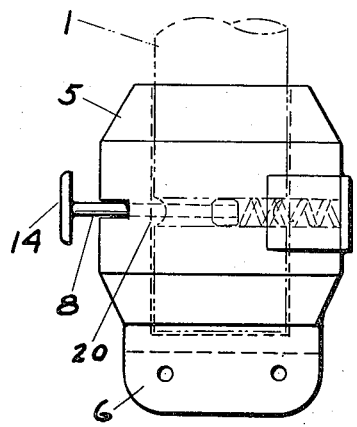
INVENTOR:
BORGER S. ELSET;
BY
Robert E Rasche
ATTORNEY.

Patented Sept. 24, 1940

2,215,580

UNITED STATES PATENT OFFICE 2,215,580

ORDNANCE MOUNT

Borger S. Elset, Amityville, N. Y., assignor to Seversky Aircraft Corporation, a corporation of Delaware Application April 21, 1938, Serial No. 203,316

3 Claims. (Cl. 89—37.5)

This invention relates to mounts for ordnance, particularly machine-guns.

One of the objects of the invention is to provide a machine-gun mount which will be peculiarly well-adapted for mounting machine-guns on aircraft.

A particular object of the invention is to provide a mount, especially for aircraft machine-guns of the type rendered flexible in use by means of an adapter including a gun-spindle, which will permit of the gun's being rotated on its spindle through a complete circle, as well as depressed and elevated, yet which will, in any position of the gun, firmly and securely restrain the gun from being unintentionally released from its mount and left adrift in the aircraft.

A further particular object of the invention is to provide a gun-mount having a socket-member for guns having a spindle-member which will allow the gun spindle to freely rotate therein, yet which will securely hold the gun against movement along the axis of the gun spindle.

A still further particular object of the invention is to provide a gun socket which will adapt gun-spindles of somewhat varying diameters and lengths to be mounted in a given-size socket.

The other objects and advantages of the invention will be made manifest as this disclosure progresses.

The presently-preferred embodiment of the inventive-concepts is illustrated in the accompanying drawing and will be described hereinafter, but it is to be understood that the invention is limited in its embodiments only by the scope of the sub-joined claims. In the drawing, Fig. 1 is a sectional view along line 1—1 of Fig. 2;

Fig. 2 is a side elevation of the socket gun-mounting detached from the aircraft, and Fig. 3 is an elevational view at right angles to Fig. 2, showing, in dotted lines, a portion of the gun spindle in place in the socket-mount.

The structure shown comprises a substantially cylindrical main-member 5, preferably chamfered, or beveled, off, at top and bottom as shown. The lower part of the cylindrical member is preferably formed into two perforated ears or lugs, 6, for attaching the mount to the aircraft.

The member 5 is cast or bored with a substantially central cylindrical opening 11 along its major axis to receive the gun-spindle 1. In the casing, parallel to the minor axis, and on each side of the bore 11, are bored or cast cylindrical channels 12, changing suddenly in diameter substantially at the points 13. Seated within the smaller-diameter portions of the channels 12 are the ends of a bifurcated member 8. Each of the ends carries a bead 7, positioned, at one extreme position of the yoke 8, substantially diametrically opposite each other on each side of the opening 11. The gun-spindle bears an annular groove 20, and in this extreme position, the beads engage in this groove. Helical springs 10 are provided in the enlarged portions of the channels 12, the outer ends of which channels are closed off by a plate 9, and the springs abut at one end against this plate and at the other, against the beads, whereby the beads are resiliently held in locking position in the annular groove. The plate 10 is removably held in place by means of the screws 22 in order to permit assembling of beads 7 on the member 8 and insertion of the springs in the bores 12.

The bight of the bifurcated member bears a thumb-button 14 to facilitate operation of the bifurcated member. A kerf 21 and cut-away 15 are provided in the casing to allow travel for the member 8 and clearance for member 14 sufficient to permit unlocking of the spindle.

In mounting the gun, by its spindle in this mount, the member 8 is urged, requiring merely the thumb of one hand, towards the bottom of the kerf 21, a distance sufficient to cause the beads to lie wholly within the back-end of the channels 12, whereupon the gun-spindle can be inserted into the aperture 11. When same seats, the thumb is removed and the beads immediately return to the position shown in Fig. 1, thereat engaging in the annular groove in the spindle, and, while permitting rotation thereof, carrying the gun, positively and directly locking the spindle against accidental removal from the mount and from vibrating out, or otherwise working out, of the mount. It is to be observed, withal, that the gun can be mounted and locked in the mount with one hand, and removed the same way.

I claim:

1. A locking but self-contained gun-post socket adapted to enclose all its working parts internally within its confines in such manner as to provide a flush-surface single article substantially free from projections, comprising a single-piece casting forming a relatively shallow, girded-in block having but small compass laterally and bearing means within its interior confines for locking the gun-post against upward vertical movement: the block having a vertical bore thru the central region thereof, said bore extending only part way down through the block, the block shell left by said bore having two horizontal bores, one on each side in the shell, the axes of said horizontal bores lying substantially tangential to the surface of the vertical bore, each of said horizontal bores being cylindrical in shape and the diameter of each horizontal bores changing part way of the length of the bore, the change in diameter being located entirely interiorly of the outer periphery of the block to thereby form two radial-seats directly on the internal periphery of said vertical bore, said two seats thus lying entirely to the interior of said block, a bail-member inserted in said horizontal bores, means on the inner ends of said bail for normally seating against said seats and projecting into the vertical bore, helical springs in the other ends of said horizontal bores, and a cover plate closing that end of said horizontal bores.

2. In a gun-mount, an adapter gun-post socket adapted to accommodate and secure gun-posts of a considerable range in diameters, comprising a member for attachment to the gun-mount, said member having a central aperture and two other apertures the axes of said apertures lying substantially tangential to the surface of the central aperture and being disposed to form two seats on the periphery of said central aperture, a curved-member mounted in one end of the horizontal bores by its open ends, the innermost portions of said ends being screw-threaded, a complementarily-threaded member adjustably mounted on each of said screw-threaded portions and normally seated on the periphery of said central bore, against said seats, one side of the members lying within the circumference of said central aperture, and means for backing the said members toward the other end of said screw-threads to vary the amount of each such member that is left projecting into the central aperture, whereby gun-posts of differing diameters may be locked in the central aperture by said members, compression members mounted in the other end of said horizontal apertures and bearing by one end against said projecting-members, and a cover for the remote end of said compression members.

3. A gun-post socket, comprising a member for attachment to the gun-mount, said member having a main aperture and other apertures, the axes of said other apertures lying substantially tangentially to the main aperture to form radial seats on the periphery of the main aperture, a curved bail member having its ends inserted into said tangential apertures, separate members mounted on the ends of said curved member and normally disposed with at least one-half the volume of said separate-members inside the circumference of said main aperture to provide a full-length, horizontal, locking surface for said gun-post to prevent both upward vertical movement thereof and to positively restrain and prevent tilting movements of said gun-post; and also disposed to normally present a full-circle bearing surface against said radial seats, the said separate-members thus serving simultaneously both as post-locks and bail-motion stops; compression members mounted in the other end of said horizontal apertures and bearing against said separate-members, and a cover for the remote ends of said compression-members.

BORGER S. ELSET.